(12) United States Patent
Yazici

(10) Patent No.: US 12,023,617 B2
(45) Date of Patent: Jul. 2, 2024

(54) COMBINED USE OF AIR-OIL SEPARATOR AND OIL FILTER IN SYSTEMS REQUIRING OIL SEPARATION AND FILTRATION

(71) Applicant: MIKROPOR MAKINA SANAYI VE TICARET ANONIM SIRKETI, Sincan (TR)

(72) Inventor: Ibrahim Kemal Yazici, Sincan (TR)

(73) Assignee: MIKROPOR MAKINA SANAYI VE TICARET ANONIM SIRKETI, Sincan (TR)

( * ) Notice: Subject to any disclaimer, the term of this patent is extended or adjusted under 35 U.S.C. 154(b) by 372 days.

(21) Appl. No.: 17/607,803

(22) PCT Filed: Jul. 8, 2019

(86) PCT No.: PCT/TR2019/050535
§ 371 (c)(1),
(2) Date: Oct. 29, 2021

(87) PCT Pub. No.: WO2020/231356
PCT Pub. Date: Nov. 19, 2020

(65) Prior Publication Data
US 2022/0226761 A1    Jul. 21, 2022

(30) Foreign Application Priority Data

May 10, 2019 (TR) ................. 2019/07061

(51) Int. Cl.
*B01D 46/00* (2022.01)
*B01D 46/24* (2006.01)

(52) U.S. Cl.
CPC ..... *B01D 46/0031* (2013.01); *B01D 46/0087* (2013.01); *B01D 46/2411* (2013.01)

(58) Field of Classification Search
CPC ............ B01D 46/0031; B01D 46/0087; B01D 46/2411
USPC ................................................ 96/4
See application file for complete search history.

(56) References Cited

U.S. PATENT DOCUMENTS

2014/0331624 A1* 11/2014 Jodi .................. B01D 46/0004
55/432

FOREIGN PATENT DOCUMENTS

| CN | 1125292    | A |   | 6/1996  |
|----|------------|---|---|---------|
| CN | 103939351  | A |   | 7/2014  |
| CN | 204025051  | U | * | 12/2014 |
| CN | 204025051  | U |   | 12/2014 |
| CN | 207554289  | U |   | 6/2018  |
| CN | 208816333  | U |   | 5/2019  |

OTHER PUBLICATIONS

International Search Report in PCT/TR2019/050535; mailed on Oct. 27, 2020.

* cited by examiner

Primary Examiner — Robert A Hopkins
Assistant Examiner — Qianping He
(74) Attorney, Agent, or Firm — Fresh IP PLC; Clifford D. Hyra; Aubrey Y. Chen

(57) ABSTRACT

The present invention relates to operation of air-oil separators and oil filters used in systems requiring oil separation and filtration on a single block. In other words, the present invention discloses an oil separation and filtration system having an air-oil separator and an oil filter.

15 Claims, 9 Drawing Sheets

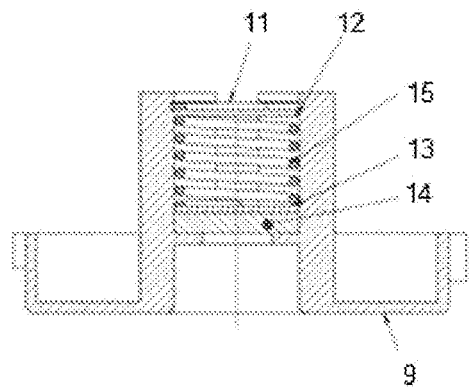
FIGURE 9A
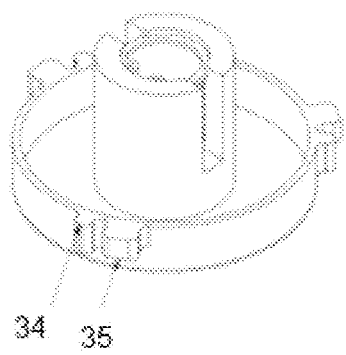
FIGURE 9B
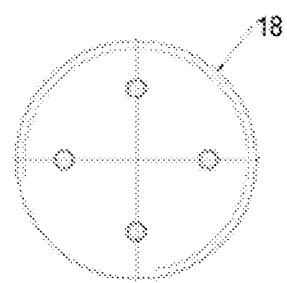 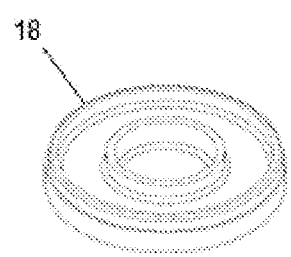
FIGURE 10A  FIGURE 10B

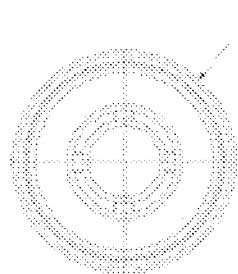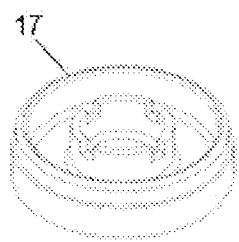
FIGURE 11A    FIGURE 11B
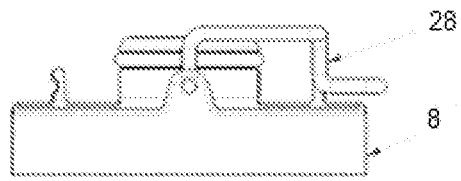
FIGURE 12A
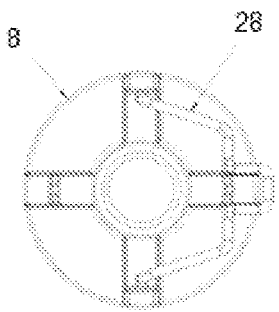
FIGURE 12B
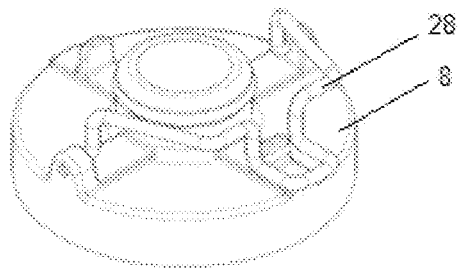
FIGURE 12C

COMBINED USE OF AIR-OIL SEPARATOR AND OIL FILTER IN SYSTEMS REQUIRING OIL SEPARATION AND FILTRATION

FIELD OF THE INVENTION

The present invention relates to the operation of air-oil separators and oil filters, used in systems requiring oil separation and filtration, on a single block.

KNOWN STATE OF THE ART

Oil separation and filtration systems are suitable for use in pressurized air compressors.

Multiple blocks can be connected to the compressors separately. Additionally, in most compressors, the oil filter and air-oil separators are connected separately. A situation as such leads to increased energy losses in systems. There is a need to develop a system that provides solutions to the problem of high energy losses due to the separate connection of oil filter and air-oil separators in compressors.

In addition, in the air-oil separators and oil filters used in the compressors of the present art, the sleeve sheet, also called as the outer sheet is plastered to the bottom plate. This creates the risks of oil leakage and low pressure resistance in the system.

Besides, the oil filter and air-oil separator used in the existing systems are discarded at the end of their life. This causes environmental pollution and increases the costs.

Documents no. DE19939970A1 and CN208651170U are the examples of a known state of the art. CN208651170U describes an air compressor oil filter which can effectively filter the lubricating oil of metal residues and dust particles and is replaced timely and quickly without damaging the compressor. DE19939970A1 describes an oil filter/air separator device for hydraulic systems. This device comprises a housing having an oil filter element. There is a need to develop a system for solving problems related to the known state of the art systems described above. It is clear that these problems have not been solved in the described documents of the known state of the art.

With the invention of the present application, the applicants aim to solve these problems and provide an oil separation and filtration system with thick housing and elements with high compressive strength and cycle time, low energy losses, less material disposal.

DETAILED DESCRIPTION OF THE INVENTION

Figures 1A, 1B, 1C:
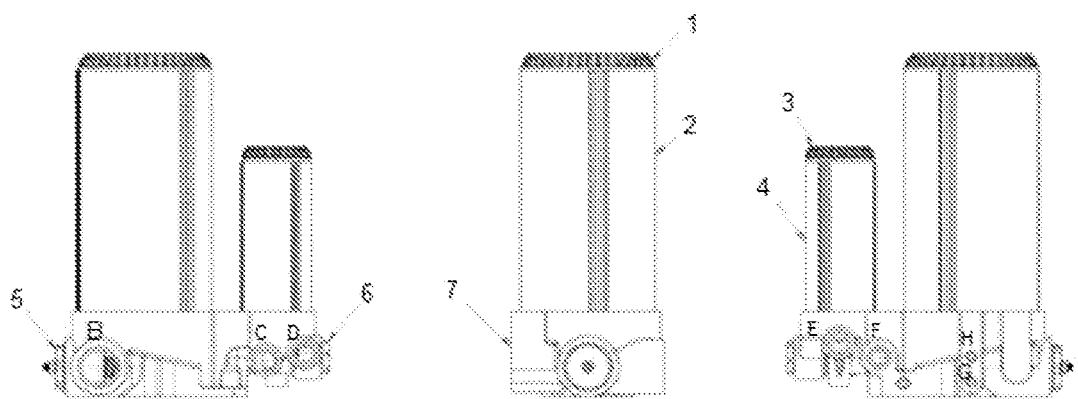
FIG. 1A View of the Product of the Invention from a Perspective
FIG. 1B View of the Product of the Invention from a Perspective
FIG. 1C View of the Product of the Invention from a Perspective

The present invention relates to the operation of the air-oil separator and oil filter used in systems requiring oil separation and filtration on a single block. In other words, the present invention discloses an oil separation and filtration system having an air-oil separator and an oil filter.

Thanks to the present invention, both energy loss is reduced and a more compact system is offered to use.

The system according to the invention, basically, comprises an air-oil separator element (27), an oil filter element (10), a minimum pressure valve (5), a temperature valve (6) and a block (7) to which these parts are connected.

In the figures of the invention, ports A-G are provided.

Figure 1D:
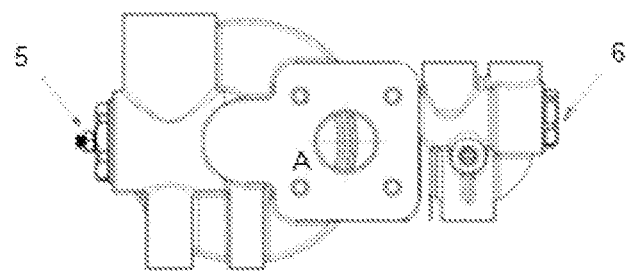
FIG. 1D View of the Product of the Invention from a Perspective

The general operating principle of the system according to the invention is as follows:

The air entering through port A (FIG. 1D) enters the air-oil separator section. The air-oil separator element (27) in the first housing (2) separates the air and oil from each other. Thanks to the minimum pressure valve (5) there is no air flow to the set value. The separated air goes out of port B to the system, and the separated oil goes from port H to the oil tank. The oil exiting the oil tank enters the oil filter element (10) (FIG. 3) through port F. According to the set value set by the temperature valve (6) therein, the heated oil is sent from port C to an external aftercooler. Here, the cooled oil enters through port D, cleaned by the oil filter element (10)

in the second housing (4) and exits from port E and is sent back to the screw group of the compressor.

In an embodiment of the invention, the wall thickness of the first housing (2) in the air-oil separator section ranges from 2 mm to 15 mm.

In an embodiment of the invention, the wall thickness of the second housing (4) in the oil filter section ranges from 2 mm to 10 mm.

Figure 2:
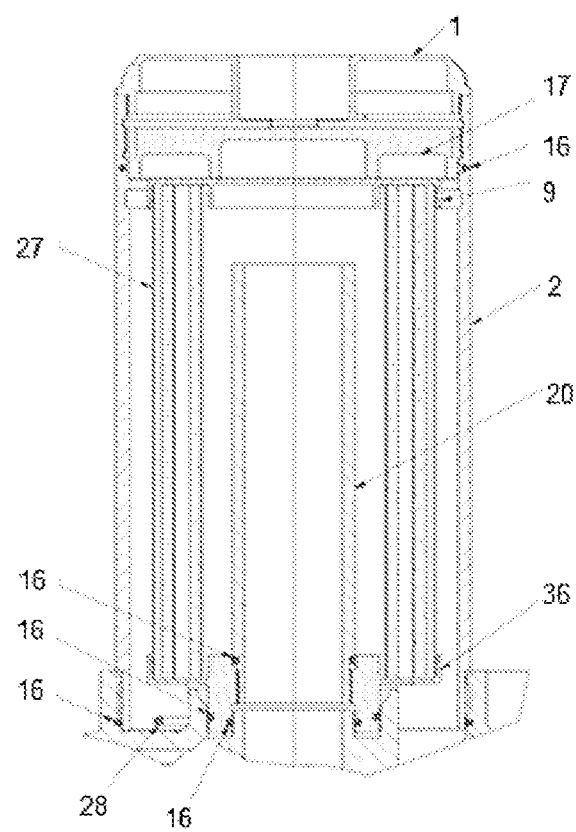
FIG. 2 View of the Section of the Product of the Invention Where Air and Oil is Separated FIG. 3 View of the Section of the Product of the Invention Where the Particles in Oil are Separated FIG. 4A A Top View of the Air Oil Separator Element of the Product of the Invention FIG. 4B A View of the Air Oil Separator Element of the Product of the Invention FIG. 5A A Top View of the Oil Filtration Element Upper Cover of the Product of the Invention FIG. 5B A View of the Oil Filtration Element of the Product of the Invention FIG. 6A A Perspective View of the Air-Oil Separator Element Upper Cover of the Product of the Invention FIG. 6B A View of the Handle Wire on the Air-Oil Separator Element of the Product of the Invention FIG. 6C A Cross-sectional View of the Air-Oil Separator Element of the Product of the Invention FIG. 6D Cross-Section Detailed View of Air-Oil Separator Element in the Product of the Invention FIG. 7A A View of the Air-Oil Separator Element Lower Cover of the Product of the Invention FIG. 7B Detailed View of Air-Oil Separating Element of the Product of the Invention FIG. 8A A View of the Air-Oil Separator and Oil Filter Element Housing of the Product of the Invention FIG. 8B A Detailed View of Air-Oil Separator and Oil Filter Element Housing of the Product of the Invention FIG. 8C A Detailed View of Air-Oil Separator and Oil Filter Element Housing of the Product of the Invention FIG. 8D A View of the Air-Oil Separator and Oil Filter Element Housing of the Product of the Invention FIG. 9A View of the Filter Element Lower Cover Performing Oil Filtration of the Product of the Invention FIG. 9B A Perspective View of the Filter Element Lower Cover Performing Oil Filtration of the Product of the Invention FIG. 10A-10B View of the Air-Oil Separator Element Housing Inner Cover of the Product of the Invention FIG. 11A-11B View of the the Oil Filter Element Housing Inner Cover of Product of the Invention FIG. 12A Side View of Upper Cover of the Oil Filter Element of the Product of the Invention FIG. 12B Top View of Upper Cover of the Oil Filter Element of the Product of the Invention FIG. 12C Perspective View of Upper Cover of the Oil Filter Element of the Product of the Invention

The air-oil separator element (27) is shown in FIG. 2.

FIG. 2 illustrates the air-oil separator element (27), housing upper cover (1), a first housing inner cover (17), a plurality of O-rings (16) providing sealing, an air-oil separator lower cover (37), an air oil separator upper cover (36), a first housing (2), a pipe (20), and a handle wire (28).

In an embodiment of the invention, the air-oil separator section (FIG. 2) comprises housing upper cover (1), a first housing inner cover (17), the housing inner cover O-ring (16) and an O-ring (16) which provides sealing where the first housing (2) is connected to the block (7). The air-oil separator element (27) in the pipe (20) provides the separation of air and oil. The O-ring (16) located in the first housing (2) and positioned between the block (7) and the first housing (2) provides sealing.

Air-oil separator element (27) which enables the separation of air and oil comprises an air-oil separator upper cover (36) and an air-oil separator lower cover (37).

It is provided that the forms such as air oil separator element special large rail (30) and air oil separator element small rail (31) located on the air-oil separator lower cover (37) enter into the first housing (2) by means of a first channel (32) located in the first housing (2). In an embodiment of the invention, the number of these forms ranges from 2 to 15.

In an embodiment of the invention, the air-oil separator element (27) mounted to the first housing (2) is rotated and locked with the help of a second channel (33) located under the first housing (2), thus it is prevented from coming out of the first housing (2).

In an embodiment of the invention, the air-oil separator element (27) is secured to the first housing (2) by means of the handle wire (28) located in the air-oil separator upper cover (36). After the air-oil mixture coming to the air-oil separator element (27) is separated, the separated air is sent to the system through the pipe (20) located in the air-oil separator element (27). This pipe (20) is mounted on the air-oil separator upper cover (36) and is an integral part of the air-oil separator upper cover (36). The separated oil is filtered to the air-oil separator upper cover (36) and is discharged through oil drain holes (29) located in the air-oil separator upper cover (36) and sent back to the screw group.

In an embodiment of the invention, the filter element comprises a plurality of oil drain holes (29) located in the filter element upper cover (8), which allow the accumulated oil to drain.

In an embodiment of the invention, the number of oil drain holes (29) ranges from 2 to 15.

Figure 3:
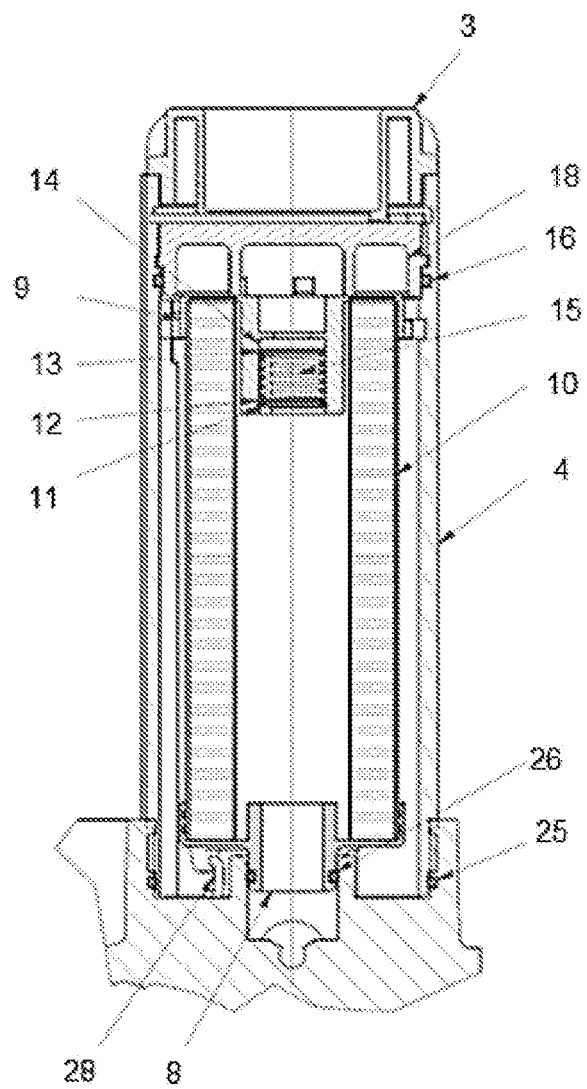
Figure 4A:
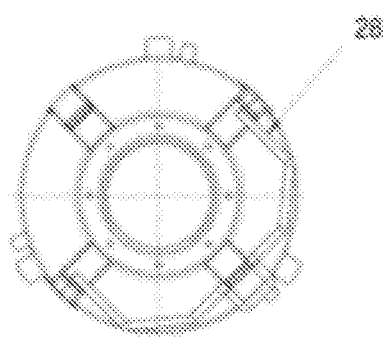
Figure 4B:
Figure 5A:
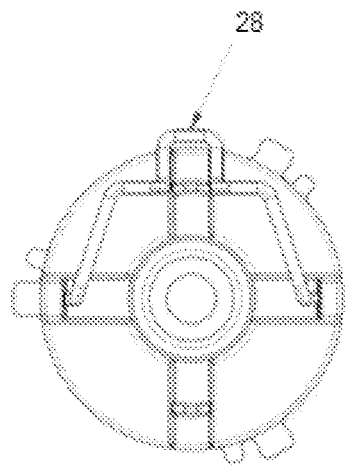
Figure 5B:
Figure 6A:
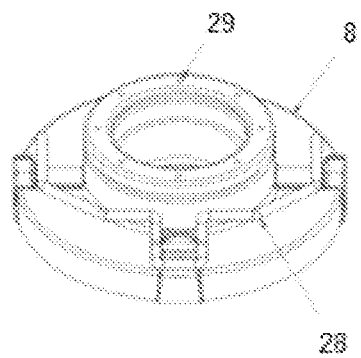
Figure 6B:
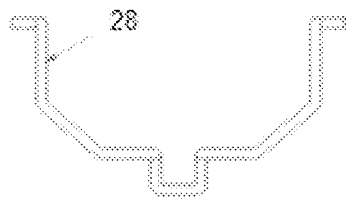
Figure 6C:
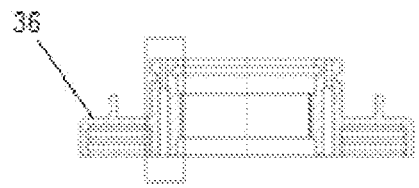
Figure 6D:
Figure 7A:
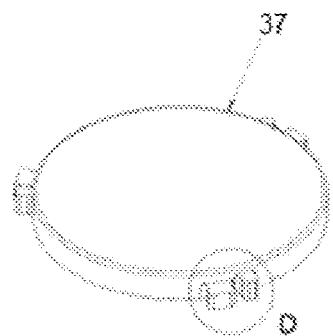
Figure 7B:
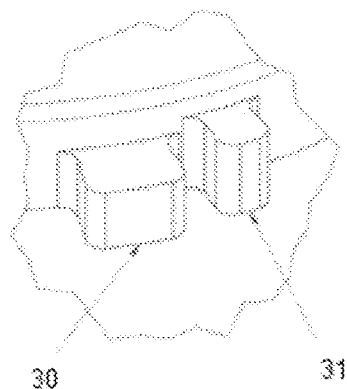
Figure 8A:
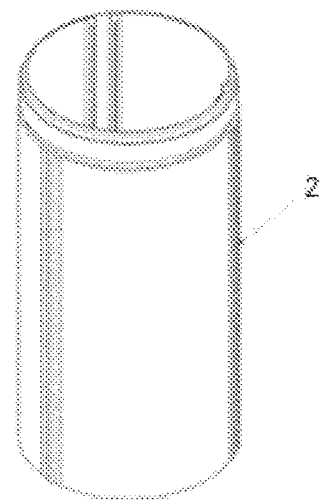
Figure 8B:
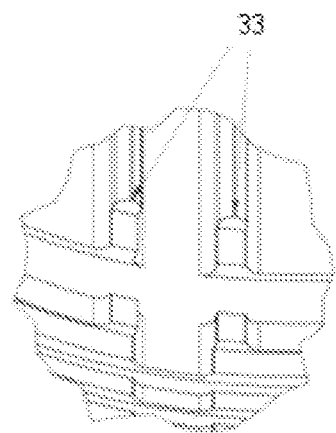
Figure 8C:
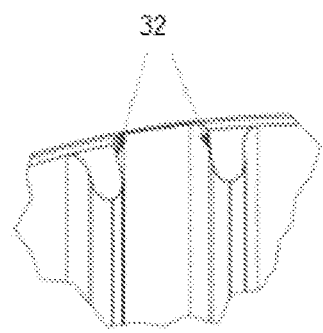
Figure 8D:
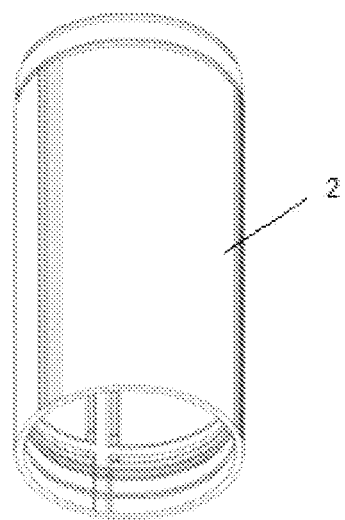

The oil filter section is shown in FIG. 3.

The oil filter section comprises oil filter element (10) for filtering particles in the oil, a second housing upper cover (3), a second housing inner cover (18), a housing inner cover O-ring (16), and an O-ring (16) which provides sealing where the second housing (4) is connected to the block (7).

Oil filter element (10) to retain particles in the oil comprises a filter element upper cover (8), a filter element lower cover (9), a handle wire (28), and at least one O-ring (16) for sealing.

The filter element special large rail (34) and the filter element special small rail (35) forms located on the filter element lower cover (9) enables the oil filter element (10) to enter the second housing (4) by means of a first channel (32) and a second channel (33) located in the second housing (4).

In an embodiment of the invention, the number of these forms ranges from 2 to 15.

In an embodiment of the invention, the filter element lower cover (9) and upper cover (8) are aluminium, polyamide, stainless steel or sheet metal.

In an embodiment of the invention, the oil filter element (10) mounted to the second housing (4) is rotated and locked by means of the second channel (33) under the second housing (4) and is prevented from coming out of the second housing (4). By means of the handle wire (28) located on the filter element upper cover (8), the oil filter element (10) is easily mounted and locked in the second housing (4). As the oil coming into the second housing (4) passes through the oil filter element (10), the particles contained in it are held by the oil filter element (10).

In an embodiment of the invention, the oil filter element (10) is mounted by locking into the second housing (4) after it is installed. In another embodiment of the present invention, the air-oil separator element (27) is locked after being inserted into the first housing (2).

FIG. 9 illustrates the view of the filter element lower cover (9) which performs oil filtration in the system of the invention, comprising a safety ring (11), a lower washer (12), an upper washer (13), a nitrile washer (14) and a spring (15). A lower washer (12), an upper washer (13), and a nitrile washer (14) are provided in the filter element lower cover (9) and provide compression of the spring (15). These parts are mounted to a channel located on the filter element lower cover (9) and locked with the safety ring (11) and serve as a pressure valve. The spring (15) thus adjusted is compressed at a certain pressure according to the set value and air passage is allowed.

In summary, the present invention is an oil separation and filtration system having an air-oil separator and an oil filter, characterized in that it comprises an air-oil separator element (27) separating the oil droplets from the air,
an oil filter element (10) that filters the particles contained in the oil,
a block (7) which holds the air-oil separator element (27) and the oil filter element (10) to work together,
multiple O-rings (16) as fasteners,
a first housing (2) in which the air-oil separator element (27) operates,
a second housing (4) in which the oil filter element (10) operates,
a minimum pressure valve (5) that does not allow air passage in accordance with the set value,
a temperature valve (6), which opens at a predetermined temperature according to the set value, allowing the heated oil to proceed to a final cooler,
for each of the air-oil separator element (27) and the oil filter element (10), a handle wire (28) to engage and lock them to the first housing (2) and the second housing (4) respectively.

Thanks to the system according to the invention, the oil filter and air-oil separator are connected together to provide a more compact structure and to reduce energy losses. In addition, thick housing used in the block increases the compressive strength and cycle time and saves the space in the compressor as the elements that have completed their life are in the housing and will be removed together with the housing. Furthermore, it is the case to dispose of the element in the housing only when it reaches the end of its life. In this case, less material is discarded and environmental pollution is reduced.

DESCRIPTIONS OF REFERENCE NUMBERS IN FIGURES

1. Housing upper cover
2. First housing
3. Second housing upper cover
4. Second housing
5. Pressure valve
6. Temperature valve
7. Block
8. Filter element upper cover
9. Filter element lower cover
10. Oil filter element
11. Safety ring
12. Lower washer
13. Upper washer
14. Nitrile washer
15. Spring
16. O-ring
17. First housing inner cover
18. Second housing inner cover
20. Pipe
27. Air-oil separator element
28. Handle wire
29. Oil drain hole
30. Air-oil separator element special large rail
31. Air-oil separator element special small rail
32. First channel
33. Second channel
34. Filter element special large rail
35. Filter element special small rail
36. Air-oil separator upper cover
37. Air-oil separator lower cover

The invention claimed is:

1. An air-oil separation and oil filtration system, comprising:
   an air-oil separator element separating oil droplets from air,
   an oil filter element that filters particles contained in oil,
   a block which holds the air-oil separator element and the oil filter element to work together,
   multiple O-rings as fasteners,
   a first housing in which the air-oil separator element operates,
   a second housing in which the oil filter element operates,
   a minimum pressure valve that does not allow air passage in accordance with a set value,
   a temperature valve which opens at a predetermined temperature according to the set value, allowing heated oil to proceed to a final cooler,
   for each of the air-oil separator element and the oil filter element, a handle wire to engage and lock the air-oil separator element and the oil filter element to the first housing and the second housing, respectively.

2. The system according to claim 1, wherein the first housing comprises a housing upper cover and wherein the second housing comprises a second housing upper cover.

3. The system according to claim 1, wherein a section where the air-oil separator element is located comprises a housing upper cover, a first housing inner cover, a housing inner cover O-ring, and an O-ring providing sealing where the first housing is connected with the block.

4. The system according to claim 1, wherein the air-oil separator element comprises an air-oil separator upper cover and an air-oil separator lower cover.

5. The system according to claim 4, further comprising a pipe O-mounted on the air-oil separator upper cover, in which air separated in the air-oil separator element is passed through.

6. The system according to claim 5, wherein the air-oil separator lower cover it comprises an air-oil separator element special large rail and an air-oil separator element special small rail, wherein a first channel and a second channel are provided in the first housing, wherein the first channel and the second channel are compatible with the air-oil separator element special large rail and the air-oil separator element special small rail, allowing the air-oil separator element special large rail and the air-oil separator element special small rail to enter the first housing.

7. The system according to claim 6, wherein the air-oil separator element special large rail and the air-oil separator element special small rail numbers between 2 and 15.

8. The system according to claim 1, wherein a section of the oil filter element comprises a second housing upper cover, a second housing inner cover, a housing inner cover O-ring, and an O-ring providing sealing where the second housing is connected to the block.

9. The system according to claim 1, wherein the oil filter element comprises a filter element upper cover a filter element lower cover, and at least one O-ring for sealing.

10. The system according to claim 9, wherein the filter element lower cover comprises a filter element special large rail and a filter element special small rail, wherein a first channel and a second channel are provided in the second housing, wherein the first channel and the second channel are compatible with the filter element special large rail and the filter element special small rail, allowing the filter element special large rail and the filter element special small rail to enter the second housing.

11. The system according to claim 10, wherein the filter element special large rail and filter element special small rail numbers between 2 and 15.

12. The system according to claim 9, wherein the filter element lower cover comprises a spring compressed to allow oil passage; a lower washer, an upper washer, and a nitrile washer, for compressing the spring; and a safety ring for mounting the lower washer, the upper washer, the nitrile washer, and the spring in a channel located in the filter element lower cover.

13. The system according to claim 1, wherein a wall thickness of the first housing and the second housing is between 2 and 15 mm.

14. The system according to claim 1, wherein the oil filter element comprises a filter element lower cover and a filter element upper cover, and wherein the filter element lower cover and the filter element upper cover are aluminum, polyamide, stainless steel, or sheet metal.

15. The system according to claim 1, wherein the oil filter element comprises a filter element upper cover, and wherein the system further comprises a plurality of oil drain holes on the filter element upper cover, to allow accumulated oil to drain.

* * * * *